United States Patent
Gu et al.

(10) Patent No.: US 12,279,034 B2
(45) Date of Patent: Apr. 15, 2025

(54) IMAGE SENSOR MODULE AND CAMERA MODULE HAVING THE SAME

(71) Applicant: SAMSUNG ELECTRO-MECHANICS CO., LTD., Suwon-si (KR)

(72) Inventors: Won Seo Gu, Suwon-si (KR); Sung Jae Lee, Suwon-si (KR); Young Rok Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 98 days.

(21) Appl. No.: 17/970,852

(22) Filed: Oct. 21, 2022

(65) Prior Publication Data
US 2023/0217093 A1     Jul. 6, 2023

(30) Foreign Application Priority Data
Dec. 30, 2021    (KR) .................. 10-2021-0192622

(51) Int. Cl.
*H04N 23/57*     (2023.01)
*H04N 23/51*     (2023.01)
(Continued)

(52) U.S. Cl.
CPC .......... *H04N 23/57* (2023.01); *H04N 23/51* (2023.01); *H04N 23/54* (2023.01); *H04N 23/55* (2023.01)

(58) Field of Classification Search
CPC ........ H04N 23/51; H04N 23/54; H04N 23/55; H01L 27/14618; H04M 1/0264; G03B 17/12
See application file for complete search history.

(56) References Cited

U.S. PATENT DOCUMENTS

2006/0227236 A1   10/2006  Pak
2008/0265350 A1*  10/2008  Wu .................. H01L 31/02325
                                                257/E31.127
(Continued)

FOREIGN PATENT DOCUMENTS

CN        101056355 A      10/2007
JP         5152695 B2       2/2013
(Continued)

OTHER PUBLICATIONS

Korean Office Action issued on Jul. 27, 2023, in counterpart Korean Patent Application No. 10-2021-0192622 (6 pages in English, 4 pages in Korean).

*Primary Examiner* — Kelly L Jerabek
(74) *Attorney, Agent, or Firm* — NSIP Law (57) ABSTRACT

An image sensor module is provided. The image sensor module includes an image sensor which has a rectangular shape having a long side and a short side; a substrate which has a long side corresponding to the long side of the image sensor and a short side corresponding to the short side of the image sensor, wherein the image sensor is mounted on the substrate; a sub-housing installed on the substrate, the sub-housing having a first sidewall disposed on a side corresponding to the long side of the image sensor and a second sidewall disposed on a side corresponding to the short side of the image sensor; and an adhesive which bonds the sub-housing and the substrate, wherein a side surface of the substrate, disposed on the long side of the substrate and an outer surface of the adhesive are disposed on a same plane.

11 Claims, 5 Drawing Sheets

(51) Int. Cl.
*H04N 23/54* (2023.01)
*H04N 23/55* (2023.01)

(56) References Cited

U.S. PATENT DOCUMENTS

2010/0126765 A1   5/2010   Kim et al.
2014/0063307 A1*  3/2014   Wang .................... H04N 23/57
                                              348/302
2021/0377448 A1  12/2021   Seo et al.

FOREIGN PATENT DOCUMENTS

| JP | 6017373 B2 | 11/2016 |
| KR | 10-2006-0107257 A | 10/2006 |
| KR | 10-2010-0059227 A | 6/2010 |
| KR | 10-2021-0147215 A | 12/2021 |

\* cited by examiner

IMAGE SENSOR MODULE AND CAMERA MODULE HAVING THE SAME

CROSS-REFERENCE TO RELATED APPLICATIONS

This application claims the benefit under 35 USC § 119(a) of Korean Patent Application No. 10-2021-0192622 filed on Dec. 30, 2021, in the Korean Intellectual Property Office, the entire disclosure of which is incorporated herein by reference for all purposes.

BACKGROUND

1. Field

The following description relates to an image sensor module and a camera module having the same.

2. Description of Related Art

Typically, a Chip-On-Board (COB) method is the most commonly used method in manufacturing a camera module. The COB process is largely comprised of laser cutting, Die Attach (D/A), Wire Bonding (W/B), and Housing Attach (H/A) processes.

Meanwhile, recently, a process of adding an optical zoom (Folded Zoom) to a camera module for mobile devices is increasing. However, in the example of the camera module having an optical zoom (Folded Zoom), since a thickness of the mobile phone may become thicker, a structure that reduces the thickness thereof is adopted. In this example, there is a problem in that a bonding space of assembly parts such as a housing, or the like is reduced, so that bonding strength is weakened, and durability is also weakened.

Therefore, it would be advantageous to develop a camera module of which a size is reduced while durability is maintained.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an image sensor module including an image sensor which has a rectangular shape having a long side and a short side; a substrate which has a long side corresponding to the long side of the image sensor, and a short side corresponding to the short side of the image sensor, wherein the image sensor is mounted on the substrate; a sub-housing installed on the substrate, the sub-housing having a first sidewall disposed on a side corresponding to the long side of the image sensor, and a second sidewall disposed on a side corresponding to the short side of the image sensor; and an adhesive, which bonds the sub-housing and the substrate, wherein a side surface of the substrate, disposed on the long side of the substrate, and an outer surface of the adhesive are disposed on a same plane.

The adhesive may be disposed on a side of the second sidewall of the sub-housing, and may be disposed on the substrate to protrude from the second sidewall.

The side surface of the substrate disposed on the long side of the substrate and the outer surface of the adhesive may be formed as a cut surface.

The image sensor and the substrate may be connected to each other by a bonding wire.

A portion of the bonding wire may be disposed to be embedded in the adhesive.

The long side surface of the substrate and the outer surface of the adhesive may be formed as a cut surface.

The substrate may be provided with a dummy portion in an area where the adhesive is disposed to protrude outwardly from the second sidewall.

An infrared filter may be disposed above the image sensor in the sub-housing.

The substrate may include an image sensor mounting portion disposed to protrude from a surface of the substrate.

The adhesive may be disposed to be spaced apart from the image sensor mounting portion.

A distance between the first sidewall, disposed on the long side of the substrate, may be shorter than a distance between the second sidewall, disposed on the short side of the substrate.

The first sidewall, disposed on the long side of the substrate, extends in a direction, parallel to the long side of the image sensor, and wherein the second sidewall, disposed on the short side of the substrate, extends in a direction, parallel to the short side of the image sensor.

A camera module includes the image sensor module, a lens module comprising a plurality of lenses through which light incident to an image sensor provided in the image sensor module passes; a housing, configured to accommodate the lens module; and a reflection module disposed in front of the lens module.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples may provide an image sensor module of which a size is reduced and a camera module having the same.

Figure 1:
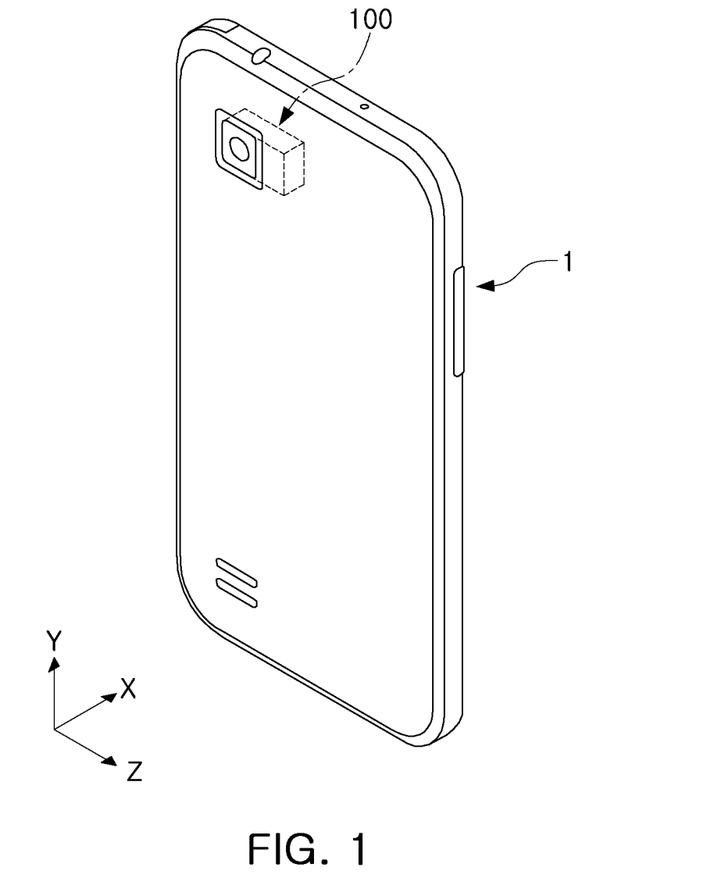
FIG. 1 illustrates a perspective view of an example portable electronic device equipped with a camera module, in accordance with one or more embodiments.

FIG. 1 illustrates a perspective view of an example portable electronic device on which a camera module, in accordance with one or more embodiments, is mounted.

Referring to FIG. 1, a camera module 100, in accordance with one or more embodiments, may be mounted on a portable electronic device 1. The portable electronic device 1 may be a portable electronic device such as, but not limited to, a mobile communication terminal, a smartphone, a tablet personal computer (PC), or the like.

As illustrated in FIG. 1, the camera module 100 is mounted on the portable electronic device 1 to capture an image of a subject.

In the one or more examples, the camera module 100 includes a plurality of lenses. Optical axes of the plurality of lenses (Z-axis) may face a direction, perpendicular to a thickness direction (X-axis direction, a direction, from a front surface toward a rear surface of the portable electronic device or in an opposite direction thereto.

For example, the optical axes (Z-axis) of the plurality of lenses provided in the camera module 100 may be formed in a width direction or a length direction of the portable electronic device 1.

Therefore, even if the camera module 100 has operations such as auto focusing (hereinafter, referred to as AF), optical zoom (hereinafter, referred to as "zoom"), and optical image stabilizing (hereinafter, referred to as OIS), the camera module 100 may prevent a thickness of the portable electronic device 1 from increasing. Accordingly, it is possible to reduce the thickness of the portable electronic device 1.

The camera module 100, in accordance with one or more embodiments, may include at least one of AF, Zoom, OIS functions, and the like.

Since the camera module 100 having the AF, Zoom, OIS functions, and the like, must be provided with various parts, a size of the camera module increases as compared to a general camera module.

When the size of the camera module 100 increases, it may be difficult to reduce the thickness of the portable electronic device 1 on which the camera module 100 is mounted.

For example, the camera module may include a plurality of lens groups to perform a zoom operation. When the plurality of lens groups are disposed in a thickness direction of the portable electronic device, the thickness of the portable electronic device increases according to the number of lens groups. Accordingly, if the thickness of the portable electronic device is not increased, the number of lens groups cannot be sufficiently secured, and the zoom performance is weakened.

Additionally, in order to implement operations such as AF, Zoom, OIS functions, and the like, an actuator that moves the plurality of lens groups in a direction of an optical axis or in a direction, perpendicular to the optical axis, or the like, should be installed. When an optical axis (Z-axis) of the lens group is formed in a thickness direction of the portable electronic device, an actuator that moves the lens group should also be installed in a thickness direction of the portable electronic device. Accordingly, the thickness of the portable electronic device is increased.

However, in the camera module 100, in accordance with one or more embodiments, since the optical axes (Z-axis) of the plurality of lenses are disposed to be perpendicular to the thickness direction (X-axis direction) of the portable electronic device 1, even when the camera module 100 having the AF, Zoom, OIS functions, and the like, is mounted thereon, the thickness of the portable electronic device 1 may be reduced.

Figure 2:
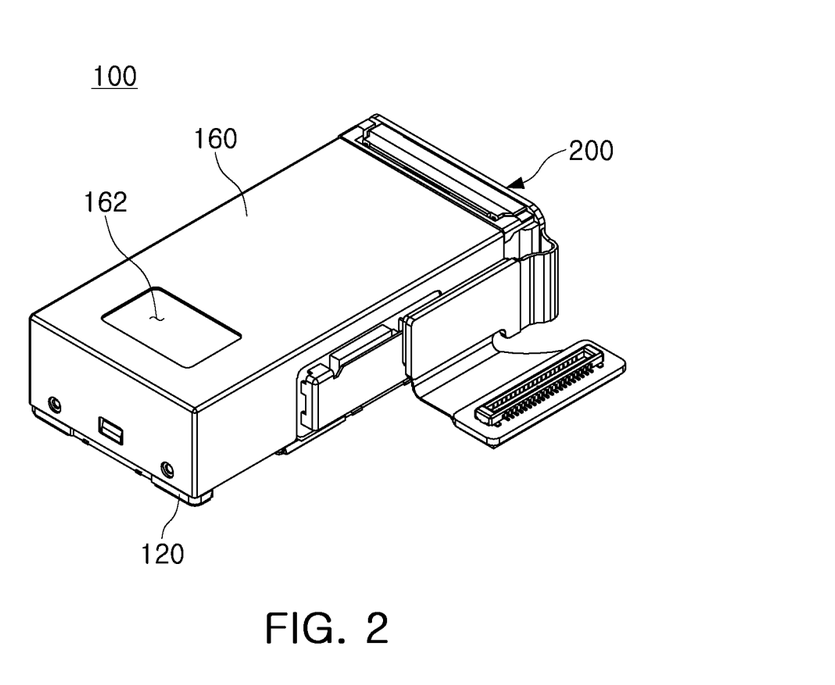
FIG. 2 illustrates a schematic perspective view of an example camera module, in accordance with one or more embodiments.
Figure 3:
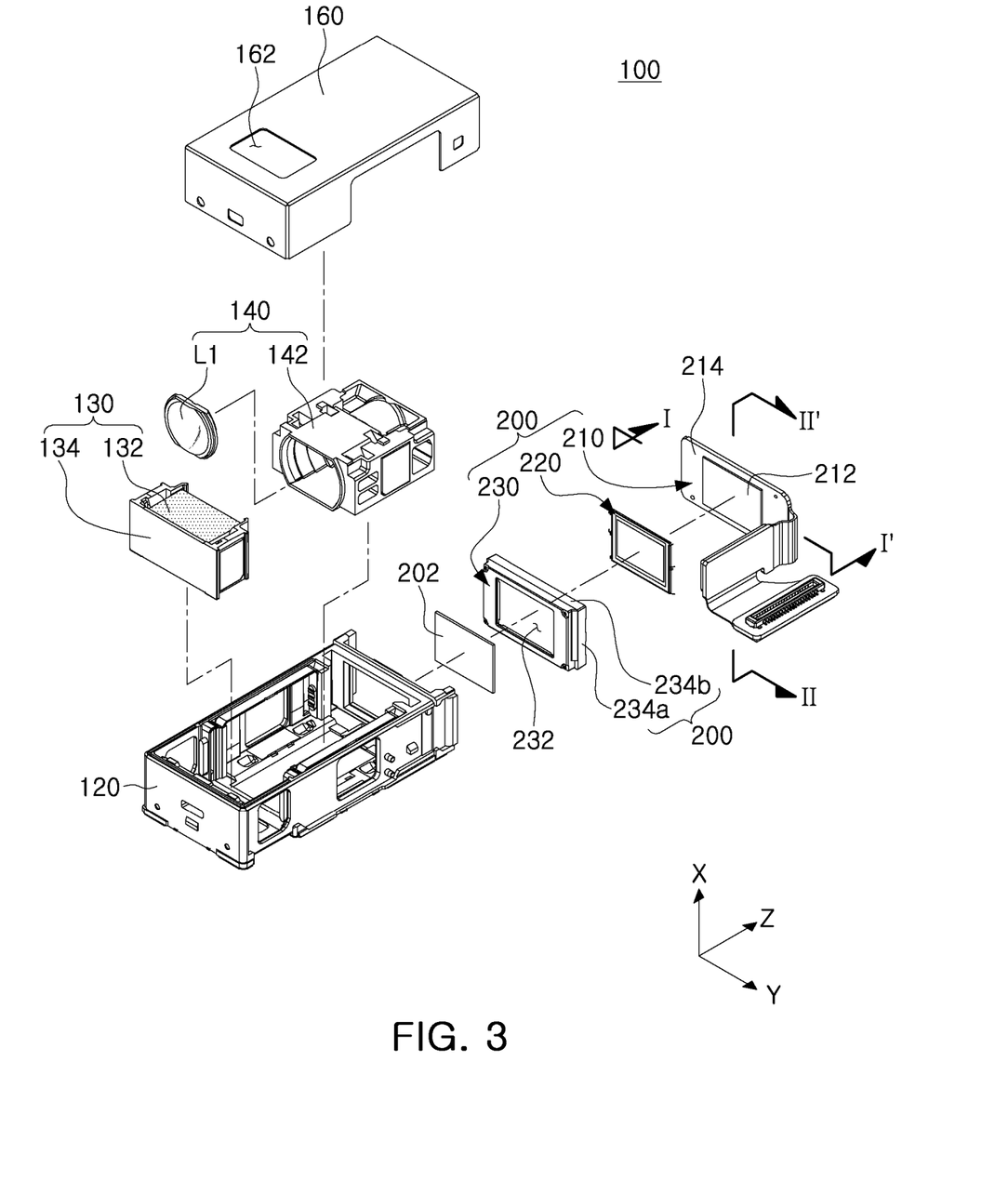
FIG. 3 illustrates a schematic exploded perspective view of an example camera module, in accordance with one or more embodiments.

FIG. 2 illustrates a schematic perspective view of a camera module, in accordance with one or more embodiments, and FIG. 3 illustrates a schematic exploded perspective view of the camera module, in accordance with one or more embodiments.

Referring to FIGS. 2 and 3, an example camera module 100 includes a housing 120, a reflection module 130, a lens module 140, an image sensor module 200, and a case 160.

In an example, the reflection module 130, a lens module 140, and the image sensor module 200 may be disposed inside the housing 120 from a first side toward a second side thereof. The housing 120 has an internal space to accommodate the reflection module 130, the lens module 140, and the image sensor module 200. However, in an example, the image sensor module 200 may be attached to the outside of the housing 120.

In FIGS. 2 and 3, an embodiment, in which the reflection module 130, the lens module 140, and the image sensor module 200 are disposed inside the housing 120, is illustrated. However, unlike the embodiments of FIGS. 2 and 3, the reflection module 130 may be disposed outside the housing 120, and in this example, one side of the housing 120 may be open so that the light transmitted from the reflection module 130 passes therethrough.

In an example, the housing 120 may have a box shape with an open upper portion.

The case 160 is coupled to the housing 120 so as to cover the upper portion of the housing 120. The case 160 has an opening 162 through which light is incident. A traveling direction or path of the light incident through the opening 162 of the case 160 is changed by the reflection module 130 and is incident on the lens module 140.

The reflection module 130 is configured to change the travelling direction of light. For example, the traveling direction of the light incident into the housing 120 may be changed toward the lens module 140 through the reflection module 130. The reflection module 130 is disposed in front of the lens module 140.

The reflection module 130 includes a reflection member 132 and a holder 134 on which the reflection member 132 is mounted.

The reflection member 132 is configured to change a traveling direction of light. For example, the reflection member 132 may be a mirror or a prism that reflects light.

The lens module 140 includes a plurality of lenses (L1) through which the light of which the traveling direction is changed by the reflection member 132 passes, a lens barrel 142 that accommodates the plurality of lenses, and a lens holder (not shown) in which the lens barrel 142 is accommodated. Meanwhile, a detailed description of the lens barrel 142 and the lens holder will be described later.

For convenience of explanation, only a lens L1 (hereinafter, referred to as a first lens) disposed closest to a side of an object, among the plurality of lenses, is illustrated in FIG. 3.

The image sensor module 200 may be disposed in the rear of the lens module 140, and the light passing through the lens module 140 is received in the image sensor module 200. In an example, the image sensor module 200 may include a substrate 210, an image sensor 220 mounted on the substrate 210, and a sub-housing 230 having an opening 232 formed therein.

Figure 4:
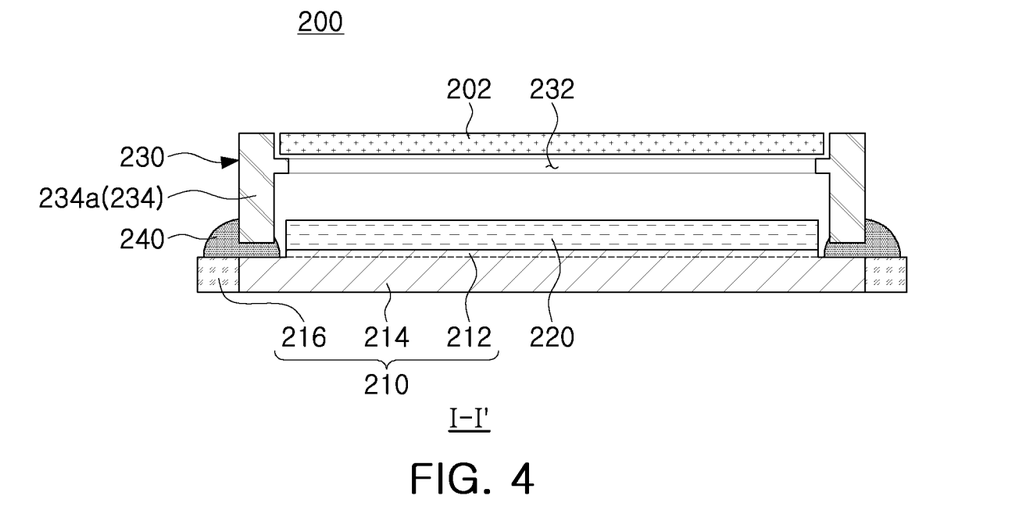
FIG. 4 illustrates a schematic cross-sectional view of the image sensor module of FIG. 3 taken along line I-I'.
Figure 5:
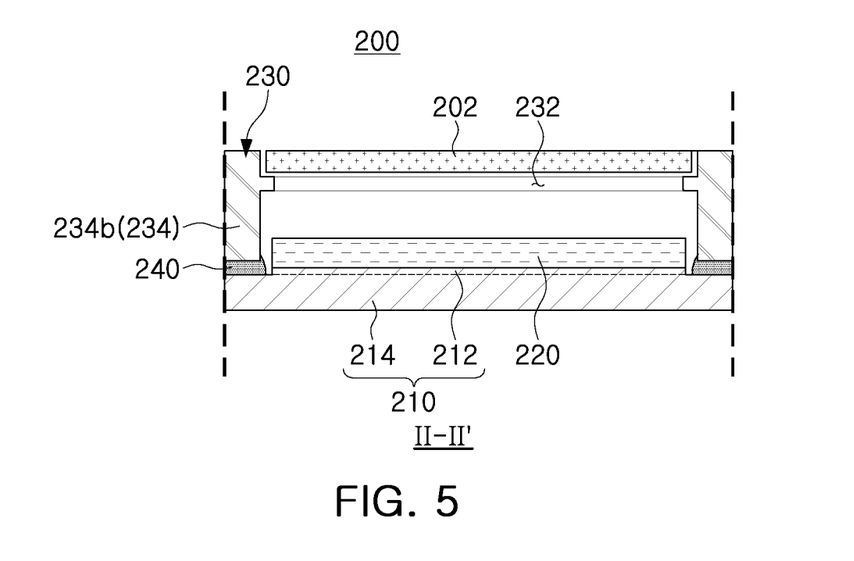
FIG. 5 illustrates a schematic cross-sectional view of the image sensor module of FIG. 3 taken along line II-II'.

FIG. 4 is a schematic cross-sectional view of the image sensor module of FIG. 3 taken along line I-I', and FIG. 5 is a schematic cross-sectional view of the image sensor module of FIG. 3 taken along line II-II'.

Referring to FIGS. 4 and 5, an image sensor module 200 may include a substrate 210, an image sensor 220, a sub-housing 230, and an adhesive 240.

The substrate 210 may include an image sensor mounting portion 212 disposed to protrude further than surroundings thereof. In a non-limiting example, the image sensor mounting portion 212 may have a shape corresponding to a shape of the image sensor 220, and may have a substantially rectangular shape. A plate portion 214 (please refer to FIG. 3), in which the image sensor mounting portion 212 is provided, may have a rectangular plate shape having a size larger than a size of the image sensor mounting portion 212. In an example, a cut surface that is cut during a manufacturing process may be provided on two side surfaces facing each other, among four side surfaces of the plate portion 214 provided on the substrate 210. In other words, a side surface that is disposed on a side of the long side among the four sides of the plate portion 214 may be cut during the manufacturing process. Accordingly, a length of the camera module 100 (please refer to FIG. 3) in an X-axis direction may be reduced. A detailed description thereof will be provided later.

Meanwhile, as illustrated in FIG. 4, a dummy portion 216 may be provided on a side of the short side, among the four sides of the substrate 210 so that the adhesive 240 is disposed to protrude from the sub-housing 230.

The image sensor 220 may be mounted on the image sensor mounting portion 212. Additionally, since the image sensor mounting portion 212 is disposed to protrude further than the surroundings thereof, or to protrude outwardly from a surface of the plate portion 214 of the substrate 210, contamination of the image sensor 220 by the adhesive 240 may be reduced. The image sensor 220 may have, for example, a rectangular plate shape. In other words, the image sensor 220 may have a rectangular shape having a long side and a short side. Meanwhile, the image sensor 220 may be disposed to be spaced apart from an inner surface of the sub-housing 230 by a predetermined distance.

The sub-housing 230 is bonded and installed to the substrate 210 via an adhesive 240. In an example, an opening 232 may be provided in the sub-housing 230, and light passing through the lens module 140 passes through the opening 232 and is received by the image sensor 220. In an example, an infrared cut-off filter 202 may be mounted on the sub-housing 230. The infrared cut-off filter 202 may cut-off light in an infrared region among the light passing through the lens module 140. In an example, the sub-housing 230 has four sidewalls 234. Second sidewalls 234a, which are two sidewalls that face each other, among the four sidewalls 234 of the sub-housing 230, may extend in a direction, parallel to the short side of the image sensor 220, and first sidewalls 234b, the remaining two sidewalls of the four sidewalls 234, of the sub-housing 230, may extend in a direction, parallel to the long side of the image sensor 220. In an example, a distance between the second sidewalls 234a, the two sidewalls which face each other, among the four sidewalls 234 of the sub-housing 230, may be greater than a distance between the first sidewalls 234b, the remaining two sidewalls of the sub-housing 230.

The adhesive 240 may bond the sub-housing 230 and the substrate 210. In a non-limiting example, the adhesive 240 may be formed of an epoxy material. In an example, the adhesive 240 may be disposed to protrude outwardly from the second sidewalls 234a, the two sidewalls which face each other, among the four sidewalls 234 of the sub-housing 230, and may be disposed not to protrude outwardly from the first sidewalls 234b, the remaining two sidewalls, among the four sidewalls 234 of the sub-housing 230. Specifically, an adhesive 240 may be applied to bond the substrate 210 and the sub-housing 230. In this example, the adhesive 240 may be disposed to protrude outwardly of the sub-housing 230. Thereafter, the adhesive 240 that protrudes from the first sidewalls 234b, two long sidewalls which face each other, among the four sidewalls 234 of the sub-housing 230, may be removed by cutting and disposed as illustrated in FIG. 5. In this example, the substrate 210 may also be cut together with the adhesive 240. In other words, an outer surface of the adhesive 240, disposed on a side of the second sidewalls 234a, the remaining two sidewalls of the sub-housing 230, may be disposed to be parallel to an outer surface of the second sidewalls 234a, the remaining two sidewalls of the sub-housing 230. That is, the first sidewall 234b of the sub-housing 230, disposed on a long side of the substrate 210, and the side surface of the substrate 210 and the outer surface of the adhesive 240 may be disposed on the same plane. The adhesive 240 protruding from the second sidewalls 234a, that is, the two short sidewalls which face each other, among the four sidewalls 234 of the sub-housing 230, is not cut and is disposed to protrude outwardly of the sub-housing 230.

As such, a long side of the substrate 210, in other words, the side disposed on the long side of the four sides of the plate portion 214 may be cut after the adhesive 240 is applied. Accordingly, the length of the camera module 100 (see FIG. 3) in the X-axis direction can be reduced. Meanwhile, the adhesive 240 and the substrate 210 may be cut by laser cutting, rotor cutting, or punch cutting, as only examples.

As described above, the size of the camera module 100 may be reduced by reducing the size of the substrate 210.

Figure 6:
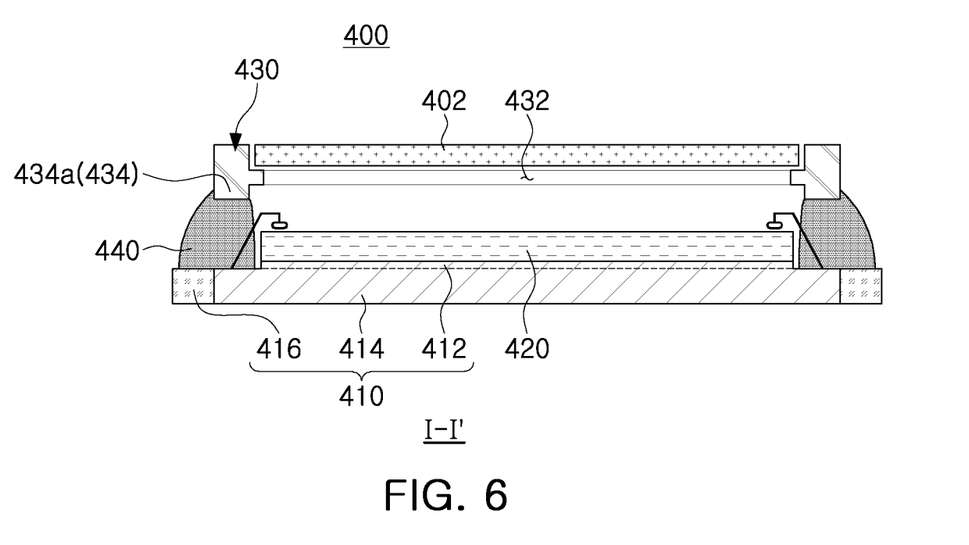
FIG. 6 illustrates a schematic cross-sectional view taken along line I-I' of FIG. 3 for a modified embodiment of the example image sensor module.
Figure 7:
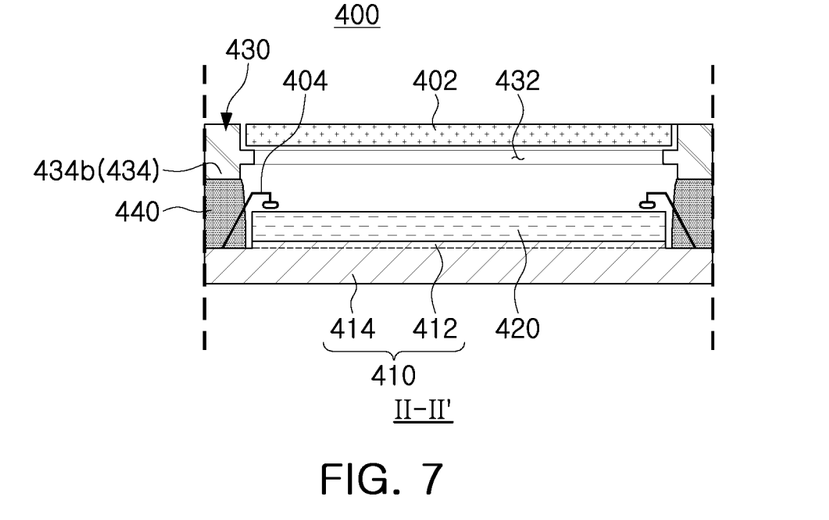
FIG. 7 illustrates a schematic cross-sectional view taken along line II-II' of FIG. 3 for a modified embodiment of the example image sensor module.

FIG. 6 is a schematic cross-sectional view taken along line I-I' of FIG. 3 for a modified embodiment of the image sensor module, and FIG. 7 is a schematic cross-sectional view taken along line II-II' of FIG. 3 for a modified embodiment of the image sensor module.

Referring to FIGS. 6 and 7, an image sensor module 400 may include a substrate 410, an image sensor 420, a sub-housing 430, and an adhesive 440.

The substrate 410 may include an image sensor mounting portion 412 disposed to protrude further than surroundings thereof. The image sensor mounting portion 412 may have a shape corresponding to a shape of the image sensor 420, and may have a substantially rectangular shape. A plate portion 414, provided with the image sensor mounting portion 412 may have a rectangular plate shape having a size, larger than that of the image sensor mounting portion 412. Meanwhile, the substrate 410 may be provided with a cut surface cut during a manufacturing process on two side surfaces facing each other, among four side surfaces of the plate portion 414. In other words, a side surface, disposed on a long side, among the four sides of the plate portion 414 may be cut during the manufacturing process. Accordingly, the length of the camera module 100 (see FIG. 3) in an X-axis direction may be reduced.

In an example, as illustrated in FIG. 6, a dummy portion 416 may be provided on a side of the short side, among the four sides of the substrate 410, so that the adhesive 440 is disposed to protrude from the sub-housing 430.

The image sensor 420 is mounted on an image sensor mounting portion 412. Since the image sensor mounting portion 412 is disposed to protrude further than surroundings thereof, contamination of the image sensor 420 by the adhesive 440 may be reduced. As an example, the image sensor 420 may have a rectangular plate shape. In other words, the image sensor 420 may have a rectangular shape having a long side and a short side. Meanwhile, the image sensor 420 may be disposed to be spaced apart from an inner surface of the sub-housing 430 by a predetermined distance. Meanwhile, the image sensor 420 may be electrically connected to the substrate 410 by a bonding wire 404. Meanwhile, the bonding wire 404 may be disposed to be embedded in the adhesive 440.

The sub-housing 430 is bonded and installed to the substrate 410 via an adhesive 440. As an example, an opening 432 may be provided in the sub-housing 430, and light passing through the lens module 440 may pass through the opening 432 to be received in the image sensor 420. Meanwhile, an infrared cut-off filter 402 may be mounted on the sub-housing 430. The infrared cut-off filter 402 serves to cut-off light in an infrared region among the light passing through the lens module 140 (see FIG. 3). In an example, the sub-housing 430 has four sidewalls 434. Second sidewalls 434a, which are two sidewalls facing each other, among the four sidewalls 434 of the sub-housing 430, may extend in a direction parallel to the short side of the image sensor 420, and first sidewalls 434b, which are the remaining two sidewalls of the sub-housing 430, may extend in a direction parallel to the long side of the image sensor 420. In an example, a distance between the second sidewalls 434a, which are two sidewalls facing each other, among the four sidewalls 434 of the sub-housing 430, may be greater than a distance between the first sidewalls 434b, the remaining two sidewalls of the sub-housing 430.

The adhesive 440 may bond the sub-housing 430 and the substrate 410. As an example, the adhesive 440 may be formed of an epoxy material. In an example, the adhesive 440 is disposed to protrude outwardly of the second sidewall 434a, which are two sidewalls that face each other, among the four sidewalls 434 of the sub-housing 430, and is disposed not to protrude outwardly of the first sidewalls 434b, the remaining two sidewalls among the four sidewalls 434 of the sub-housing 430. Specifically, an adhesive 440 is applied for bonding the substrate 410 and the sub-housing 430. In this example, the adhesive 440 is disposed to protrude outwardly of the sub-housing 430. Thereafter, the adhesive 440 that protrudes further than the first sidewall 434b, which is two long sidewalls facing each other among the four sidewalls 434 of the sub-housing 430, is removed by cutting and disposed as illustrated in FIG. 7. In this example, the substrate 410 may also be cut together with the adhesive 440. In other words, an outer surface of the adhesive 440, disposed on a side of the second sidewall 434a, that is the remaining two sidewalls of the sub-housing 430, may be disposed parallel to the outer surface of the second sidewall 434a, which is the remaining two sidewalls of the sub-housing 430, and the side surface of the substrate 410. That is, the outer surface of the first sidewall 434b, that is a sidewall of the sub-housing 430 disposed on a long side of the substrate 410, and the side surface of the substrate 410 and the outer surface of the adhesive 440 may be disposed on the same plane. The adhesive 440 that protrudes from the second sidewall 434a, which are two short sidewalls facing each other, among the four sidewalls 434 is not cut and may be disposed to protrude outwardly of the sub-housing 430.

As such, a side of a long side of the substrate 410, that is, a side disposed on the long side of the four sides of the plate part 414 may be cut after the adhesive 440 is applied. Accordingly, a length of the camera module 100 (see FIG. 3) in an X-axis direction can be reduced. In an example, the adhesive 440 and the substrate 410 may be cut by laser cutting, rotor cutting, or punching, as only examples.

As described above, the size of the camera module 100 may be reduced by reducing the size of the substrate 410.

As set forth above, in one or more examples, there is an effect that the size can be reduced.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image sensor module, comprising:
   an image sensor which has a rectangular shape having a long side and a short side;
   a substrate which has a long side corresponding to the long side of the image sensor, and a short side corresponding to the short side of the image sensor, wherein the image sensor is mounted on the substrate;
   a sub-housing installed on the substrate, the sub-housing having a first sidewall disposed on a side corresponding to the long side of the image sensor, and a second sidewall disposed on a side corresponding to the short side of the image sensor; and
   an adhesive, which bonds the sub-housing and the substrate,
   wherein a side surface of the substrate, disposed on the long side of the substrate, and an outer surface of the adhesive are disposed on a same plane,
   wherein the substrate comprises an image sensor mounting portion disposed to protrude from a surface of the substrate, and
   wherein the adhesive is disposed to be spaced apart from the image sensor mounting portion.

2. The image sensor module of claim 1, wherein the adhesive is disposed on a side of the second sidewall of the sub-housing, and is disposed on the substrate to protrude from the second sidewall.

3. The image sensor module of claim 1, wherein the side surface of the substrate disposed on the long side of the substrate and the outer surface of the adhesive are formed as a cut surface.

4. The image sensor module of claim 1, wherein the image sensor and the substrate are connected to each other by a bonding wire.

5. The image sensor module of claim 4, wherein a portion of the bonding wire is disposed to be embedded in the adhesive.

6. The image sensor module of claim 5, wherein the long side surface of the substrate and the outer surface of the adhesive are formed as a cut surface.

7. The image sensor module of claim 1, wherein the substrate is provided with a dummy portion in an area where the adhesive is disposed to protrude outwardly from the second sidewall.

8. The image sensor module of claim 1, wherein an infrared filter is disposed above the image sensor in the sub-housing.

9. The image sensor module of claim 1, wherein a distance between the first sidewall, disposed on the long side of the substrate, is shorter than a distance between the second sidewall, disposed on the short side of the substrate.

10. The image sensor module of claim 1, wherein the first sidewall, disposed on the long side of the substrate, extends in a direction, parallel to the long side of the image sensor, and
   wherein the second sidewall, disposed on the short side of the substrate, extends in a direction, parallel to the short side of the image sensor.

11. A camera module, comprising:
   the image sensor module of claim 1;
   a lens module comprising a plurality of lenses through which light incident to an image sensor provided in the image sensor module passes;
   a housing, configured to accommodate the lens module; and
   a reflection module disposed in front of the lens module.

* * * * *